UNITED STATES PATENT OFFICE.

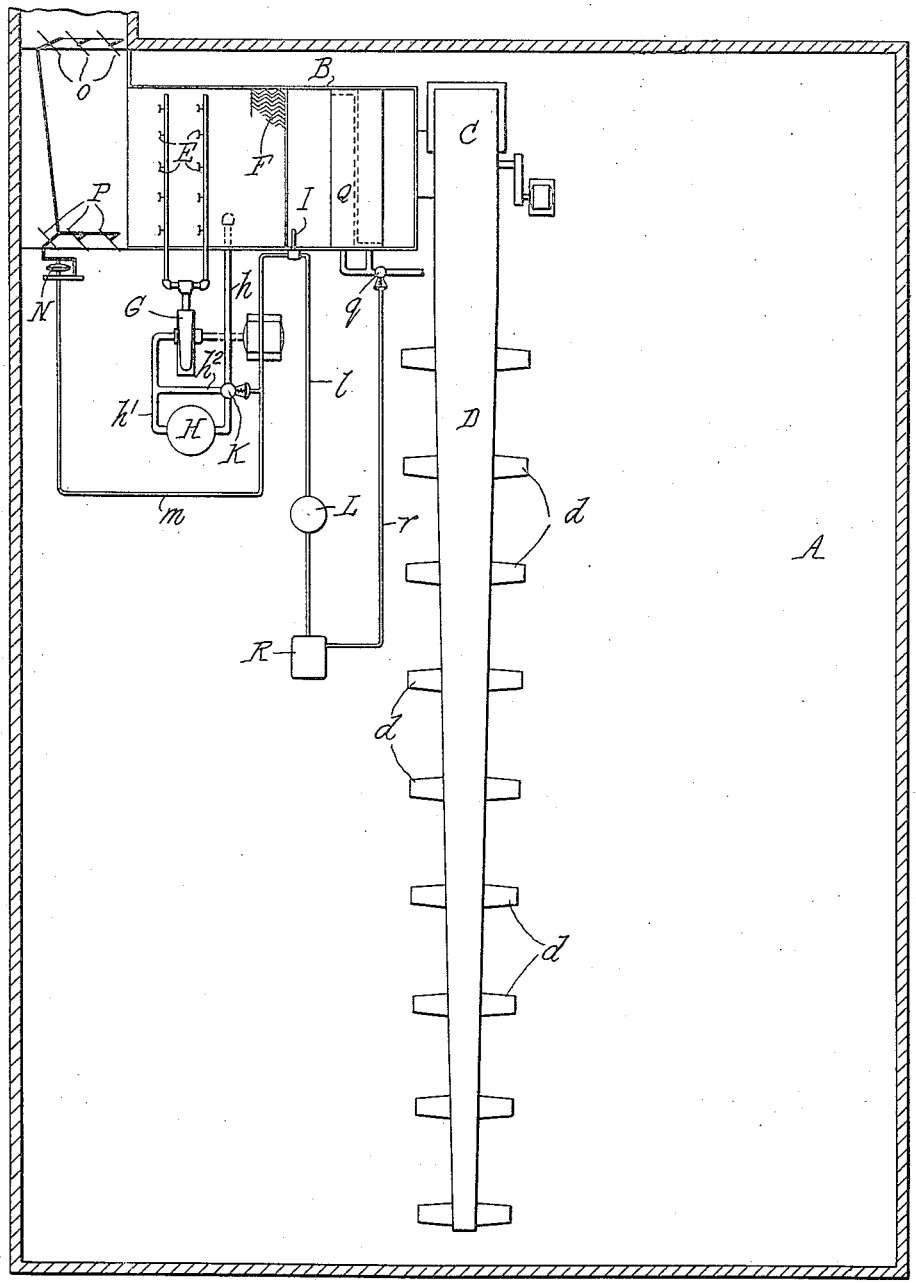

ALFRED E. STACEY, JR., OF CHICAGO, ILLINOIS, ASSIGNOR TO CARRIER ENGINEERING CORPORATION, OF NEW YORK, N. Y.

METHOD OF DRYING MATERIAL.

1,312,759.  Specification of Letters Patent.  Patented Aug. 12, 1919.

Application filed September 6, 1917. Serial No. 190,060.

*To all whom it may concern:*

Be it known that I, ALFRED E. STACEY, Jr., a citizen of the United States, residing at Chicago, in the county of Cook and State of Ill., have invented a new and useful Improvement in Methods of Drying Material of which the following is a specification.

This invention relates to a method of drying materials in which the condition of humidity of the atmosphere in the drying room or chamber is regulated so as to control or graduate the drying action in a definite manner.

In drying various hygroscopic materials it has been found desirable to graduate the drying action, using at the start an atmosphere having a comparatively high humidity to prevent too rapid drying of the material and gradually, or by stages, reducing the humidity of the atmosphere to increase gradually or by stages the drying effect until a definite point is reached at which the material will give off no further moisture but will normally contain the amount required in the finished product. Attempts have been made to accomplish such results by the use of hygrostatic controls, but these are objectionable on account of the necessity for continuous adjustment of the relative humidity by changing the setting of the hygrostats and on account of the fact that the settings of the hygrostat usually employed for the purpose are not permanent and each adjustment has to be verified by means of psychrometer readings which involve considerable time and also experience and skill. Hygrostats are furthermore very unreliable under certain conditions, especially with high temperatures and humidities.

The object of this invention is to obtain the desired graduated or controlled drying of materials by a practical and efficient method which avoids the difficulties involved in the use of hygrostats and the methods theretofore employed. This object is attained by controlling the relation between the dew point of the air supplied to the drying room and the temperature in the drying room as hereinafter described.

In carrying out this method, the air which is to be supplied to the drying room is passed through an air conditioner in which the air is humidified or dehumidified before it is introduced into the room. In the air conditioner, humidifier or dehumidifier the air is caused to be saturated at a definite temperature, which can be controlled, for example, by a thermostat influenced by the temperature of the saturated air, as in the usual dew point system of control, so that the air introduced into the drying room will have a predetermined dew point or absolute humidity. This air is delivered to the drying room and is heated either by means of a heater placed in the air delivery duct to the room or by a heater placed in the drying room, or both. The relative humidity in the room is not controlled directly, but indirectly by the control of the temperature of the drying room or the air supplied acting in conjunction with the natural rate at which moisture is given off from the material. When the drying process is begun and the material is practically saturated, the moisture is given off at a high rate and as a result the relative humidity in the room is high and the dew point of the air in the room is much higher than that of the air introduced. The relative humidity and the dew point in the room gradually decrease as the material gives up its moisture and the dew point of the room gradually approaches the dew point of the air supplied to the room. When this step is reached a definite relative humidity must exist by virtue of the definite temperature and the dew point maintained. The material also gives off no further appreciable moisture at this point since a state of equilibrium is reached at which the material contains moisture corresponding closely to the relative humidity of the surrounding air. The drying operation is then continued in a similar manner, either by adjusting the control of the humidifier or dehumidifier so as to supply to the room air having a lower dew point, or by raising the temperature in the room, the drying action continuing until a state of equilibrium is again reached. The operation is continued in this manner by steps or stages until the material contains only the desired amount of moisture.

In drying some materials, such for instance as macaroni, the saturated air supplied to the room will be maintained at a substantially constant temperature, in which case, owing to the decreasing rate at which the moisture is given off by the material, the dew point in the room itself will decrease gradually to the dew point of the air supplied to the room. When the material is reduced to that moisture content which agrees with the temperature and dew point maintained, the temperature of the room is raised to give a lower relative humidity. In drying materials where the temperature in the drying room cannot exceed a certain definite degree, the temperature in the room is maintained constant throughout the drying operation and at the end of each drying period or stage, that is when the material does not give off further moisture, the thermostat controlling the dew point in the humidifier or dehumidifier is adjusted to lower the dew point of the air supplied to the room, thereby reducing the relative humidity in the room. This operation is repeated step by step until the moisture content of the material has been reduced to the desired point.

The accompanying drawing shows in a diagrammatic plan view, partially in section, an apparatus suitable for carrying out the hereindescribed method.

In said drawing, A indicates a room or chamber in which the material is to be dried and B an air conditioning casing or chamber through which the air for delivery to the room A passes and in which the dew point of the air is controlled. A fan C draws air through the conditioning chamber B and delivers it by means of a suitable duct or ducts D to the room A. Preferably the air is discharged under pressure into the room through nozzles $d$ which are located at suitable intervals along the supply duct and are so disposed that the air discharging from these nozzles induces an active circulation of the larger volume of air in the room A. In this way a relatively large volume of air in the room is put in circulation and a thorough mixture is made of the air introduced with the air in the room so as to secure uniformity of the atmosphere in all parts of the room. E represent spray nozzles for discharging water or other suitable liquid in the form of a fine spray or mist into the conditioning chamber for washing and determining the dew point of the air passing through the chamber. After leaving this spray, the air passes through an eliminator F of any suitable construction which removes the entrained moisture or free particles of spray liquid from the air. The spray liquid is delivered under pressure to the nozzles E by a pump G which takes the spray liquid collecting in the lower part of the conditioning chamber or in a suitable collecting well, the spray liquid being circulated and used over and over again.

The temperature at which the air is saturated in the conditioning chamber for regulating the dew point of the air can be controlled by any suitable means, for instance, as shown, a device H of any suitable sort adapted to change the temperature of the spray liquid is provided, and more or less of the spray liquid is caused to pass through this temperature changing device, or to be by-passed around the same under the control of the thermostat I located in the air conditioning chamber so as to be influenced by the temperature of the saturated air leaving the eliminator. The device H will be either a heater or cooler for the spray liquid, depending upon the conditions of operation and upon whether it is necessary to humidify or dehumidify the air to obtain the desired dew point. The pump is adapted to draw the liquid from the collecting well either through the temperature changing device H by pipes $h$ and $h'$ or through a by-pass pipe $h^2$. The passage of the liquid through the device H or through the by-pass pipe is determined by the position of a diaphragm or motor actuated valve K which is controlled by the thermostat I through any suitable instrumentality, such as compressed air in an air pipe or line $l$ leading from an air reservoir L, or other suitable source of compressed air, to the diaphragm valve K. The thermostat I is set to maintain a predetermined temperature of the saturated air and if this temperature varies the thermostat through the medium of the compressed air operates the diaphragm valve K to cause more or less of the spray liquid to pass through or by-pass around the device H, thereby raising or lowering the temperature of the liquid as may be necessary to give the desired saturation temperature in the conditioning chamber. This thermostat can be set to cause the air in the conditioning chamber to be saturated at the necessary temperature to give the air any desired dew point and the setting of the thermostat can be changed from time to time to give the different desired dew points necessary for the successive steps or stages of the drying operation.

In the apparatus shown in the drawings the thermostat I also controls the flow of compressed air through a pipe $m$ to the diaphragm or motor N which actuates dampers O and P respectively, controlling the admission of fresh or outside air and return air from the room A to the air conditioning chamber B. The diaphragm N is connected to the dampers O and P by any suitable mechanism adapted to close one set of dampers and simultaneously open the other set of dampers to thereby regulate the proportions of fresh and return air admitted to the air conditioning chamber. The control of the proportions of fresh and return air is thus used in conjunction with the control for varying the temperature of the spray liquid to regulate the saturation temperature in the air conditioning chamber.

Q represents a heater of any suitable sort, such for instance as a steam coil, for giving the required temperature in the room A. As shown, this heater is located in the casing B and heats the air after it has been saturated in the conditioning chamber and before it is delivered to the drying room A. The heater could, however, be located in any other way so as to heat the room A or the air supplied to the room. The steam supply to this heater is regulated by a diaphragm or motor actuated valve $q$ under the control of a thermostat R which is located in the room, or otherwise, so as to operate in response to changes in temperature in the room. As shown, this thermostat controls the supply of compressed air in a pipe $r$ connecting the compressed air reservoir with the steam valve for actuating this valve. The thermostat is set to give the desired temperature in the room A and its adjustment can be changed from time to time as necessary to give different temperatures suitable for the successive steps of the drying operation.

It is not intended to limit this invention to an apparatus of any particular construction for regulating the dew point of the air which is supplied to the room, as any suitable apparatus adapted to condition air so as to definitely fix its dew point and capable of regulation to give different desired dew points can be used.

In carrying out the method the thermostats R and I are set to give the temperature in the drying room A and the dew point of the air supplied to the room suitable for the commencement of the drying operation. As before explained, the relative humidity in the room will be high at first when the material contains considerable moisture and will gradually decrease until a state of equilibrium is reached and the material does not give up further moisture. When this state is reached, or the relative humidity in the room has lowered to a desired percentage, either the thermostat R is adjusted to maintain a higher temperature in the room or the thermostat I is adjusted to lower the dew point of the air supplied to the room, depending upon the nature of the material being dried or the particular results desired. Either of these adjustments results in lowering the relative humidity in the room so that the drying is continued. The adjustments can be made so as to regulate the number and length of the drying periods or stages, as may be most suitable for the particular material being treated or the results desired.

I claim as my invention:—

1. The hereindescribed method of drying material, which consists in supplying to the room containing the material air having a definite dew point lower than the dew point in said room, continuing the supply of such air until the dew point of the air in the room is reduced approximately to said definite dew point of the air supplied to the room, then causing a change in the relation between the temperature of the room and the dew point of the air supplied to the room and continuing this relation until the dew point of the air in the room is again reduced approximately to the dew point of the air supplied to the room.

2. The hereindescribed method of drying material, which consists in supplying to the room containing the material air having a definite dew point lower than the dew point in said room, continuing the supply of such air until the material ceases to give off moisture, then causing a change in the relation between the temperature of the room and the dew point of the air supplied to the room to reduce the relative humidity in the room, and continuing this relation until the material again ceases to give off moisture.

3. The hereindescribed method of drying material, which consists in subjecting the material in a room during successive periods of time to atmospheres having successively lower relative humidities, said successively lower humidities being effected by causing changes in the relation between the temperature of said room and the dew point of air supplied to the room.

4. The hereindescribed method of drying material, which consists in supplying air to the room containing the material, controlling the relative humidity in said room by maintaining a predetermined definite relation between the dew point of the air supplied to the room and the temperature in the room, continuing said relation for a period of time, then causing a definite change in said relation to reduce the relative humidity in the room, said operation being repeated until the moisture content of the material is reduced to the desired point.

5. The hereindescribed method of drying material, which consists in supplying air to the room containing the material, maintaining a substantially constant dew point of said air and a substantially constant temperature in said room for a period of time, thereby regulating the relative humidity in the room, and then causing a change in the relation between the temperature of the room and the dew point of the air supplied to the room to give a lower relative humidity in the room.

6. The herein described method of drying material, which consists in supplying to the room containing the material air having a definite dew point lower than the dew point in said room, continuing the supply of such air until the dew point of the air in the room is reduced a predetermined amount, then causing a rise in the temperature of the room and continuing the supply of said air having said definite dew point until the dew point of the air in the room is again reduced a predetermined amount.

7. The hereindescribed method of drying material, which consists in supplying to the room containing the material air having a definite dew point lower than the dew point in said room, continuing the supply of such air until the dew point of the air in the room is reduced approximately to said definite dew point of the air supplied to the room, then causing a rise in the temperature of the room and continuing the supply of said air to the room until the dew point of the air in the room is again reduced approximately to the dew point of the air supplied to the room.

Witness my hand this 31st day of July, 1917.

ALFRED E. STACEY, Jr.

Witnesses:
C. WEBSTER ANDREWS,
LOTTA O. SLOAN.